US007887181B1

(12) United States Patent
Chen

(10) Patent No.: US 7,887,181 B1
(45) Date of Patent: Feb. 15, 2011

(54) EYEGLASS STRUCTURE WITH DETACHABLE VIEWING LENS

(76) Inventor: Chun-Nan Chen, 182, Haichung St., An Nan District, Tainan (TW)

( * ) Notice: Subject to any disclaimer, the term of this patent is extended or adjusted under 35 U.S.C. 154(b) by 0 days.

(21) Appl. No.: 12/618,768

(22) Filed: Nov. 15, 2009

(51) Int. Cl.
G02C 7/08 (2006.01)

(52) U.S. Cl. .............................. 351/57; 351/83; 351/86

(58) Field of Classification Search .................. 351/41, 351/44, 47, 49, 57, 83–86, 154
See application file for complete search history.

(56) References Cited

U.S. PATENT DOCUMENTS 6,086,199 A * 7/2000 Holland et al. ................ 351/86

* cited by examiner

Primary Examiner—Huy K Mai
(74) Attorney, Agent, or Firm—Leong C. Lei

(57) ABSTRACT

The eyeglass structure mainly contains a frame and a viewing lens. At each interface between a front opening and the two temple members of the frame, a positioning slot with a protruding block therewithin is provided. On the other hand, two positioning pieces, each with a notch, are extended from the two ends of the viewing lens. To install the viewing lens, the positioning pieces are threaded into the positioning slots and the protruding blocks are embedded into the notches to secure the viewing lens. To detach the viewing lens, the positioning pieces are pulled to break out the locking of the protruding blocks and pushed to escape the confinement of positioning slots. The installation and detachment are therefore could be easily and conveniently conducted.

4 Claims, 6 Drawing Sheets

EYEGLASS STRUCTURE WITH DETACHABLE VIEWING LENS

(A) TECHNICAL FIELD OF THE INVENTION

The present invention generally relates to eyeglasses or spectacles, and more particularly relates to an eyeglass structure whose viewing lens could be conveniently assembled or detached.

(B) DESCRIPTION OF THE PRIOR ART

Conventionally, the attachment between an eyeglass' frame and its viewing lens or lenses is either a fixed one or a detachable one. However, whether it is fixed or detachable, the assembly usually requires experience. Especially for those with special viewing lenses, the eyeglass' original viewing lenses have to be removed first before the installation of a new pair of viewing lenses. Therefore, for the conventional attachment means, there are some obvious disadvantages as follows.

First, conventional viewing lenses are configured to fit in the frame's specific positions and then fixed by screws or other means. Usually experienced personnel are required for the job, which is quite inconvenient to the users.

Secondly, whether it is made of polycarbonate (PC) or other material, the viewing lenses are fixedly installed before the eyeglasses are shipped out of factory. When different types of lenses are required, people usually purchase a new pair of eyeglasses, adding to the users' burden and trouble.

SUMMARY OF THE INVENTION

The present invention teaches a novel eyeglass structure mainly containing a frame and a viewing lens. The viewing lens could be made of polycarbonate or could be a polarized lens. The viewing lens could be installed individually on the frame or additionally to the frame where another lens is already installed. The gist of the present invention is as follows. At each interface between a front opening and the two temple members of the frame, a positioning slot with a protruding block therewithin is provided. On the other hand, two positioning pieces, each with a notch, are extended from the two ends of the viewing lens. To install the viewing lens, the positioning pieces are threaded into the positioning slots and the protruding blocks are embedded into the notches to secure the viewing lens. When the temple members are unfolded, the positioning pieces are further clamped to further enhance the attachment of the viewing lens to the frame. To detach the viewing lens, the temple members are first folded to relieve the positioning pieces and to reveal the positioning slots. The positioning pieces are then pulled to break out of the locking of the protruding blocks and pushed to escape the confinement of the positioning slots. The installation and detachment are therefore could be easily and conveniently conducted. In addition, the eyeglass structure allows the installation of a polarized lens onto a frame where a polycarbonate lens is already installed.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
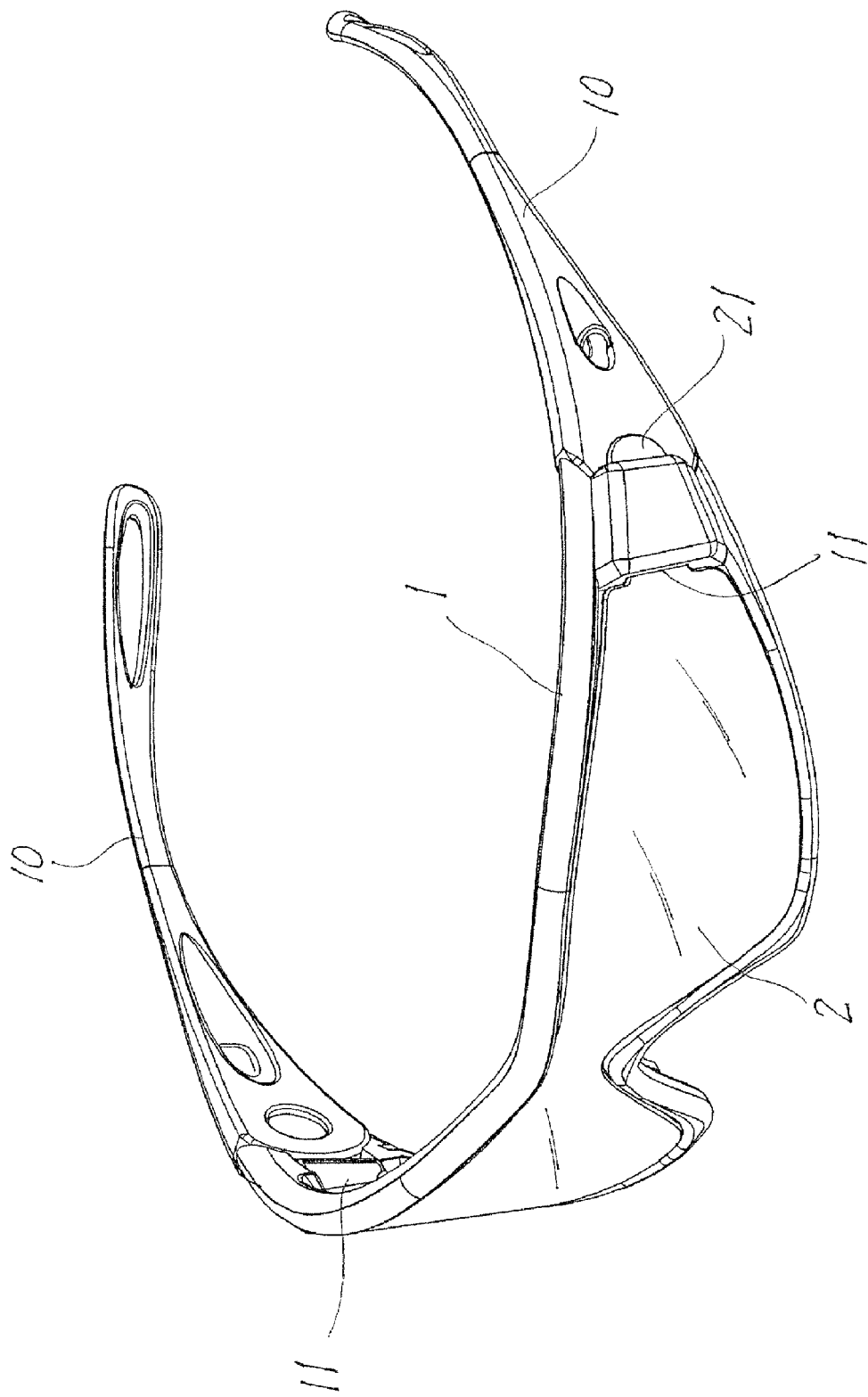
FIG. 1 is a perspective diagram of an eyeglass structure according to an embodiment of the present invention.

As shown in FIG. 1, an eyeglass structure according to an embodiment of the present invention mainly contains a frame 1 and a viewing lens 2 which could be made of polycarbonate and could be polarized. The frame 1 contains two foldable temple members 10 which are extended backward from a front opening of the frame 1 to the frame 1's left and right sides. At the interfaces between the front opening and the temple members 10, two positioning slots 11 are provided, respectively. The viewing lens 2 is installed in the front opening with its left and right ends threaded into the positioning slots 11, respectively. Positioning pieces 21 are configured along the viewing lens 2's left and right ends, respectively, so that they run compatibly into the positioning slots 11, respectively. When the foldable temple members 10 are unfolded, the positioning pieces 21 are further clamped by the temple members 10 for enhancing the attachment between the viewing lens 2 and the frame 1.

Figure 2:
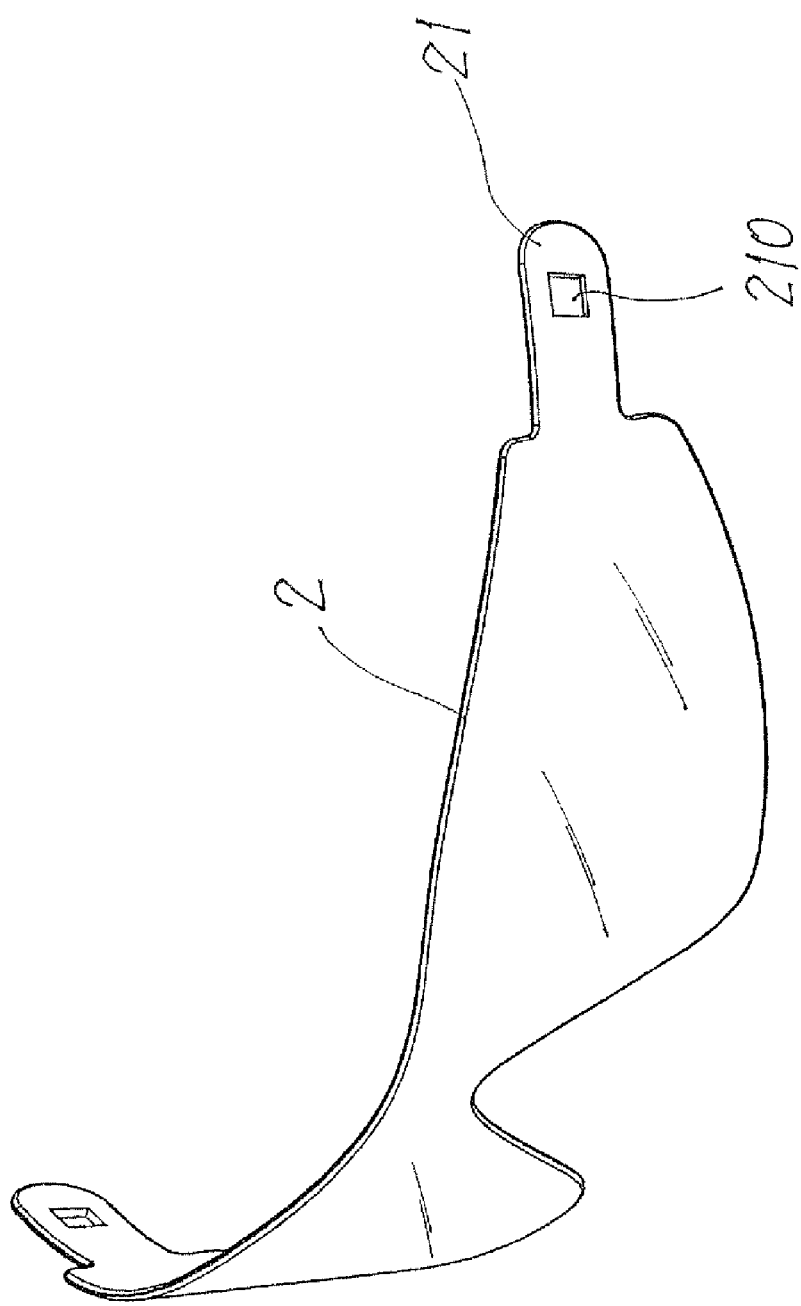
FIG. 2 is a perspective diagram of a viewing lens for the eyeglass structure of FIG. 1.

An exemplary shape of the viewing lens 2 is specifically illustrated in FIG. 2. As illustrated, the viewing lens 2 is shaped to conform to the shape of the front opening of the frame 1. Please note that each positioning piece 21 has a notch 210.

Figure 3:
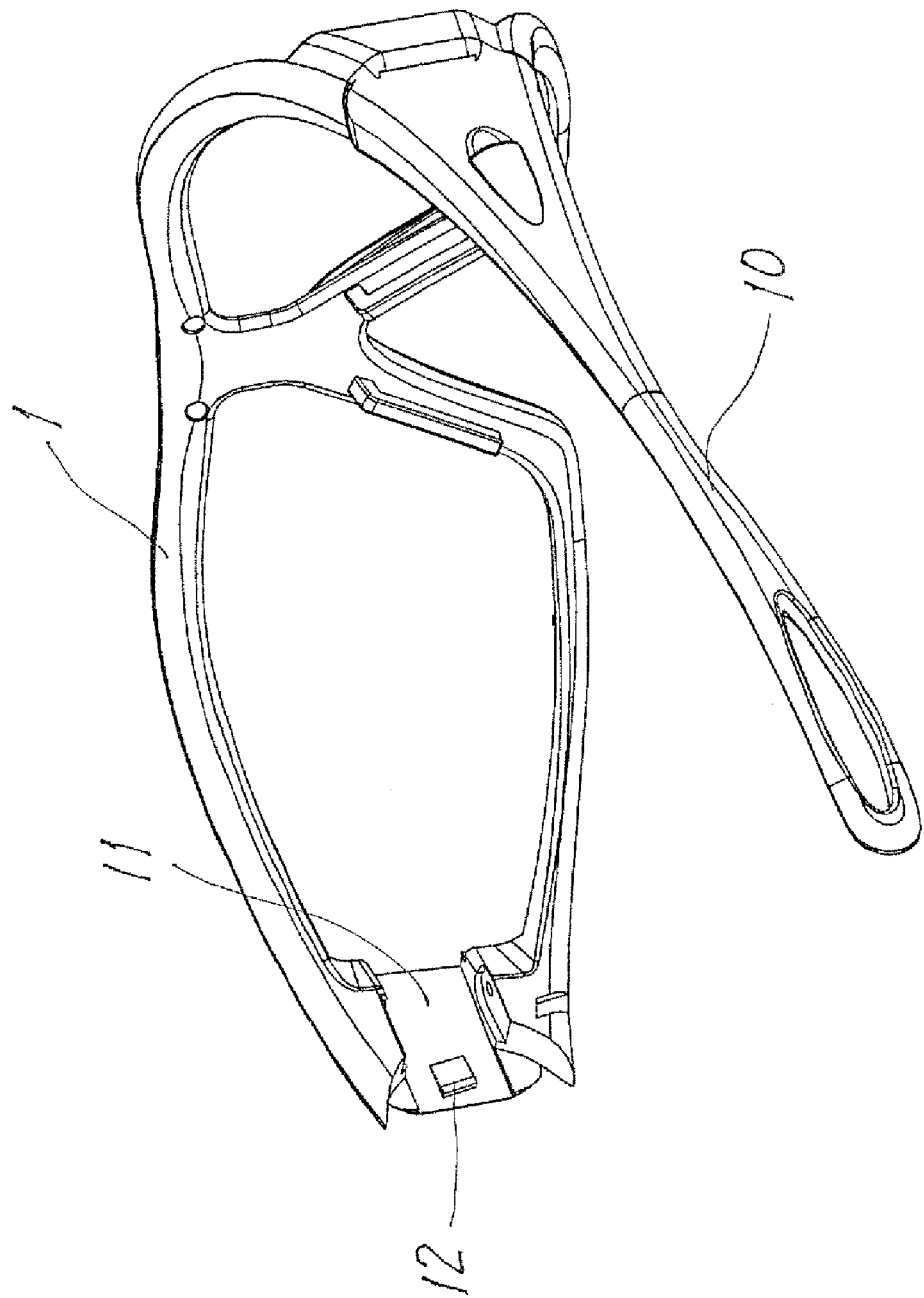
FIG. 3 is a perspective diagram showing a positioning slot of the eyeglass structure's frame of FIG. 1.
Figure 4:
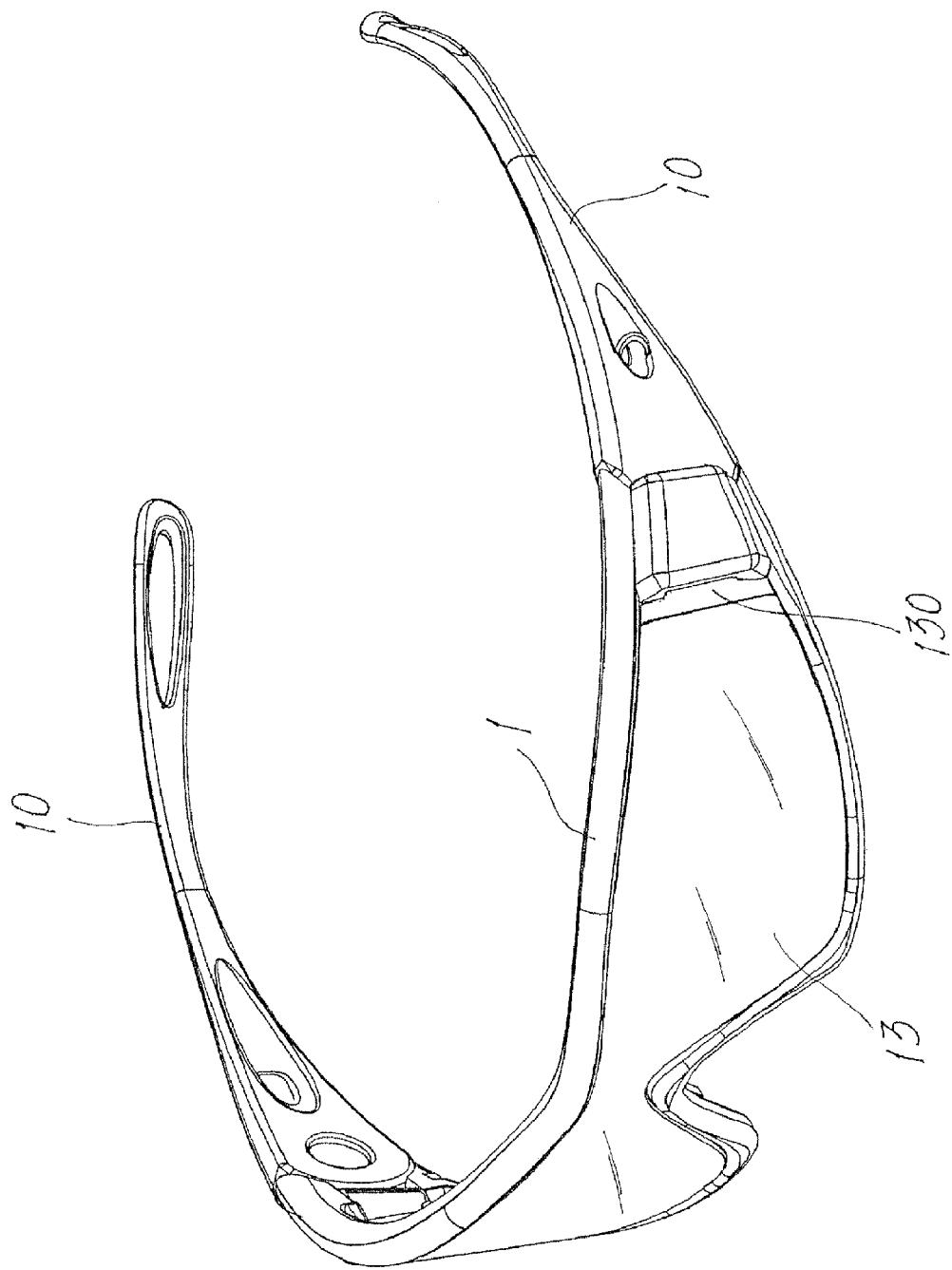
FIG. 4 is a perspective diagram showing an eyeglass structure according to another embodiment of the present invention where a lens is already installed.
Figure 5:
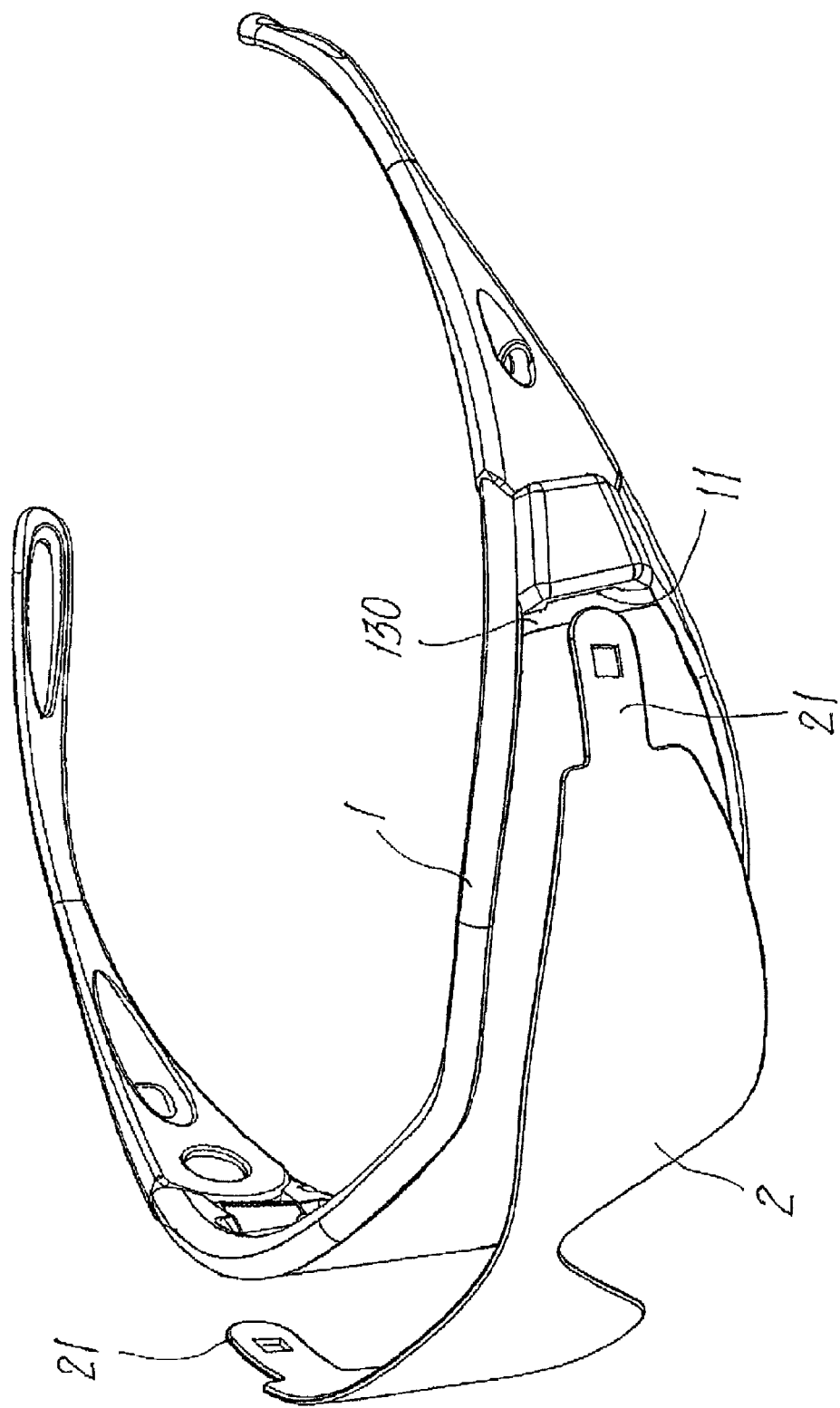
FIG. 5 is a perspective diagram showing the installation of an additional lens to the eyeglass structure of FIG. 4.

As further shown in FIG. 3 where a temple member 10 is removed to reveal a positioning slot 11, a protruding block 12 is provided inside the positioning slot 11. Please note that the eyeglass structure disclosed by the present invention allows the installation of more than one viewing lens. As illustrated in FIG. 5, a polycarbonate lens 13 (with no positioning pieces) is already fixedly installed in the front opening of the frame 1 where a gap 130 is reserved between the polycarbonate lens 13 and the positioning slots 11. As such, an additional polarized lens 2 could be installed in front of the polycarbonate lens 13 by threading its positioning pieces 21 through the gaps 130 and into the positioning slots 11.

Figure 6:
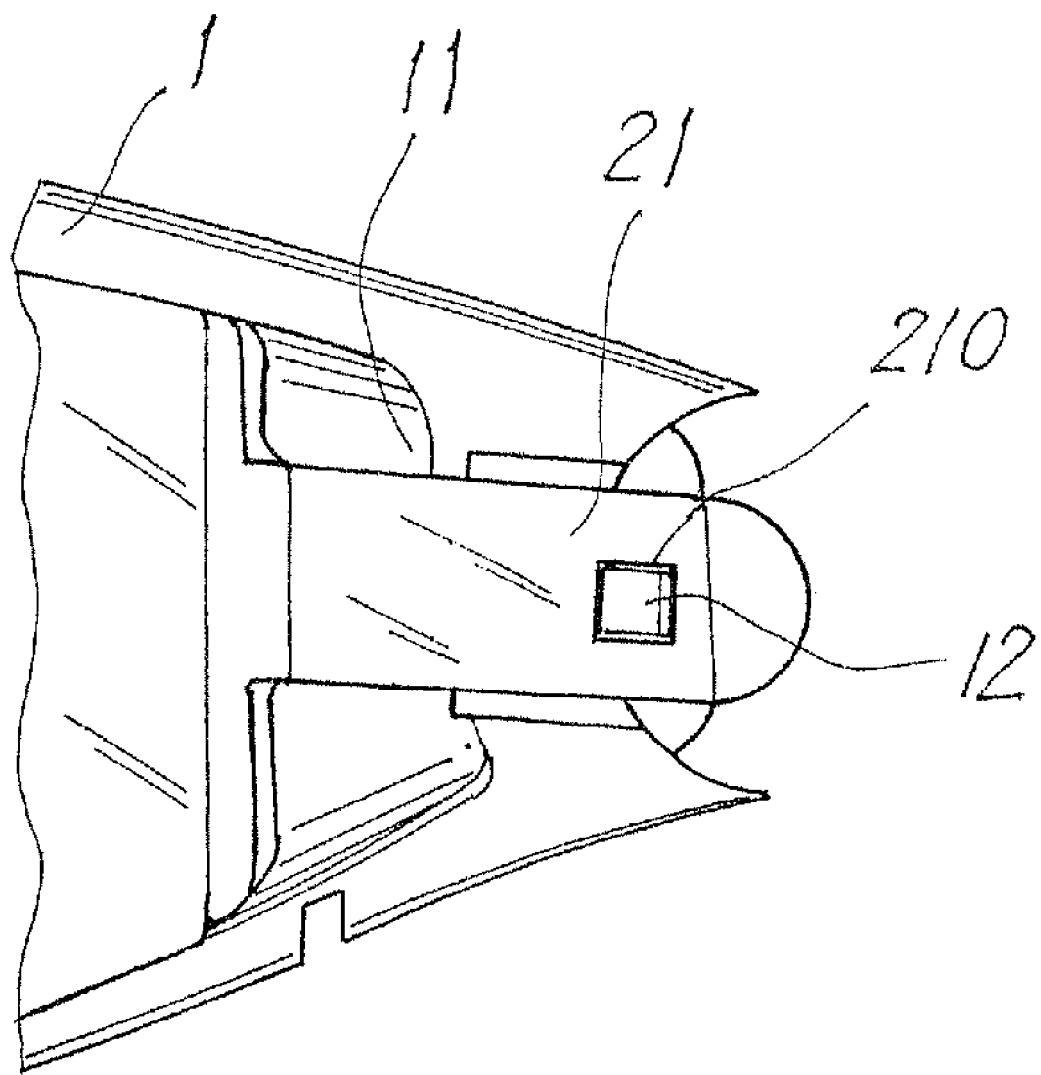
FIG. 6 is a perspective diagram showing the interlocking between a positioning piece of the viewing lens and the positioning slot of the frame of the eyeglass structure of FIG. 4.

The installation of the viewing lens 2 is further illustrated in FIG. 5. First, a positioning piece 21 at a side of the viewing lens 2 is threaded into a positioning slot 11 through the gap 130. The protruding block 12 is embedded into the notch 210 of the positioning piece 21 as shown in FIG. 6 so that the positioning piece 21 is locked to the positioning slot 11. Then, by the flexibility of the viewing lens 2, the viewing lens 2 is bended so that the positioning piece 21 at the other end is threaded into the positioning slot 11 at the other side of the frame 1. Again, the protruding block 12 there is embedded into the notch 210 of the other positioning piece 21 so that the viewing lens 2 is securely positioned in front of the already installed lens 13. When the temple members 10 are unfolded, they will further clamp the positioning pieces 21 for further enhancing the positioning of the viewing lens 2.

To detach the viewing lens 2, first, the temple members 10 are folded so that the positioning pieces 21 are not clamped and the positioning slots 11 are revealed. The positioning pieces 21 are then pulled so that the notches 210 break out of the locking by the protruding blocks 12. In the mean time, the positioning pieces 21 are pushed forward so that they are released from the confinement of the positioning slots 11. The viewing lens 2 is therefore completely detached from the frame 1. As described, the installation and detachment of the viewing lens to and from the frame could be easily and conveniently conducted. In addition, the viewing lens 2 of the present invention could have a planar shape and is not required to have a curvature as most of the conventional lenses are required. Therefore, the production and cost could be simplified and reduced.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An eyeglass structure, comprising:
   a frame having a front opening and two foldable temple members extended backward from two sides of said front opening where, at each interface between said front opening and said temple members, a positioning slot with a protruding block therewithin is provided; and
   a detachable first viewing lens having a shape conforming to said front opening, said first viewing lens having two positioning pieces, each with a notch, extended from two ends of said first viewing lens; wherein, when said positioning pieces are threaded into said positioning slots, said protruding blocks are detachably embedded into said notches, respectively.

2. The eyeglass structure according to claim 1, wherein, when said temple members are unfolded, said positioning pieces of said first viewing lens are clamped by said temple members, respectively.

3. The eyeglass structure according to claim 1, further comprising a second viewing lens fixedly installed in said front opening; wherein a gap is reserved between each positioning slot and said second viewing lens; and each positioning piece of said first viewing lens is threaded into said positioning slot through said gap.

4. The eyeglass structure according to claim 1, wherein said first viewing lens is flexible and has a planar shape.

* * * * *